(12) United States Patent
Nair et al.

(10) Patent No.: US 7,889,962 B2
(45) Date of Patent: Feb. 15, 2011

(54) COMPACT HIGH DENSITY CENTRAL OFFICE FIBER DISTRIBUTION SYSTEM

(75) Inventors: K. R. Suresh Nair, Cochin (IN); Kizakkekuttu Parameswaran Chandran, Cochin (IN); Benoy Sarasan, Cherthala (IN); Kapplingattu Narayanan Pradeep, Cherthala Johor Bahru (MY); Aniz Muhammad, Kannankara (IN)

(73) Assignee: AM Networks, Chantilly, VA (US)

( * ) Notice: Subject to any disclaimer, the term of this patent is extended or adjusted under 35 U.S.C. 154(b) by 0 days.

(21) Appl. No.: 12/347,625

(22) Filed: Dec. 31, 2008

(65) Prior Publication Data

US 2010/0166377 A1    Jul. 1, 2010

(51) Int. Cl.
*G02B 6/00* (2006.01)
(52) U.S. Cl. .................. 385/135; 385/134; 385/136; 385/137
(58) Field of Classification Search ............. 385/134, 385/135, 136, 137
See application file for complete search history.

(56) References Cited

U.S. PATENT DOCUMENTS 6,181,862 B1 * 1/2001 Noble et al. ............... 385/135
6,804,353 B2 * 10/2004 Schmokel ............... 379/413.04
6,819,856 B2 * 11/2004 Dagley et al. ............. 385/134
7,376,219 B2 * 5/2008 Witty et al. .............. 379/26.01

OTHER PUBLICATIONS

The Notification of Transmittal of the International Search Report and the Written Opinion of the International Searching Authority issued in Int'l Patent Application No. PCT/US2009/068743, prepared Jan. 28, 2010, and mailed Jun. 7, 2010, 9 pages.

* cited by examiner

*Primary Examiner*—Jennifer Doan
(74) *Attorney, Agent, or Firm*—Sterne, Kessler, Goldstein & Fox P.L.L.C.

(57) ABSTRACT

A fiber distribution system having a rack mounted chassis and a fiber distribution rack to mount in the chassis. The system includes one or more splitter modules which are designed to be mounted in the fiber distribution rack. The splitter modules have a compact design and contain a plurality of fiber splitters. The system also includes a plurality of spools, which are located on opposite sides on the rack mounted chassis, and used to support the routing of fibers. The spools are configured to equally share the fiber load coupled to a fiber distribution rack between a pair of spools. The fiber distribution system also contains a cable guide tray for supporting the fiber cables and the system includes a plurality of radius limiters to minimize cable bends.

23 Claims, 12 Drawing Sheets

COMPACT HIGH DENSITY CENTRAL OFFICE FIBER DISTRIBUTION SYSTEM

BACKGROUND

1. Field

The present invention relates to a high density central office fiber distribution system having a splitter module, a rack mountable panel, and double spools for reducing complexity, weight, and cost of a fiber distribution system.

2. Background

Central office fiber distribution systems call for high density fiber management and a substantial amount of splitting of fiber cable signals. Because of the amount of signal splitting required, the space needed to house the system increases with the density of fiber cable splitters. Likewise, when fiber cable routing is at high densities it makes the routing of the fiber cables difficult and it becomes a very difficult task to properly manage the fiber cables without causing sharp bends. The pressure caused by sharp bends usually results in signal strength loss.

Known designs for central office fiber distribution systems use a swing-out panel design for fiber cable connections. These designs typically utilize the rear of the system for fiber cable entry. Because of the engineering of these designs, they require a large number of parts, are difficult to manage, and are very heavy. Not just anyone can work on the known designs for fiber cable distribution systems. Specialized tools and specially trained staff are typically needed to properly install and maintain them.

In order to achieve some amount of organization, a fiber cable distribution system needs certain features which improve its utility. One such feature is a series of spools spaced amongst the panels. Spools are used to wrap, hang, and/or guide fiber cables before connection to the panel. Using the spool helps to eliminate slack and/or unwanted tension on the fiber cable. Known designs use a spool on only one side of a distribution panel. Thus, every fiber cable going to a nearby panel, no matter how close or how far away the connection is, uses the closest spool. This creates a higher fiber cable density at each spool and reduces fiber cable management quality. The higher the density of fiber cable, the greater the chances of damage occurring to a fiber cable.

Because of the swing-out panel/module design of known systems, making fiber changes, while not impossible, is not easy. First, the panel must be opened and then the individual module that the fiber is connected to must be found and accessed. But this is all done with a maze of fibers interfering with straight-forward access. There is also a complex and burdensome rear cable entry method. Further, there is a chance that all the mechanical movement of the panel and module will introduce bends in the fibers and thereby degrade the transmitted signal quality.

SUMMARY

According to an embodiment of the invention, there is provided a fiber distribution system (FDS) including a rack mounted chassis. The FDS has a fiber distribution rack that can be mounted to the chassis. The fiber distribution rack is configured to accept a plurality of splitter modules which are preloaded with multiple splitters of different configurations/types. The FDS further includes pairs of spools which are located on opposing sides of the rack mounted chassis. There is at least one such pair. By using pairs of spools, the fiber cable routing management can be improved which in turn helps prevent damage to fiber cables.

In another embodiment of the invention, the splitter module is an integral part of the FDS and comprises a self-contained sealed enclosure including a plurality of splitters. The input side of the splitter modules have a face flange and a plurality of Splice Closure (SC) adapters. In order to affix the splitter modules to the fiber distribution rack, a pair of fasteners is included on the face flange of each splitter module. The splitter module also includes a smaller flange along another of its faces. This smaller flange is inserted into a pair of guides evenly spaced in the fiber distribution rack and allows for easy and controlled installation and removal of the splitter modules.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIG. 6B also shows a front cable guide which is different from the one shown in FIGS. 5D and 6A.

FIG. 8 also shows a rear perspective of the splitter modules fully installed in the fiber distribution racks.

DETAILED DESCRIPTION

While the invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The present invention is directed to a central office fiber distribution system, such as a rack mountable plurality of splitter modules. A rack mountable chassis is combined with a plurality of cable guides and a plurality of spool pairs, oppositely positioned to efficiently and carefully route fiber cable into and out of the distribution rack. The embodiment of the invention illustrated and described hereinafter is constructed to improve high-fiber density management problems, to reduce the distribution system footprint, to reduce overall weight, and to be more cost effective.

Figure 1:
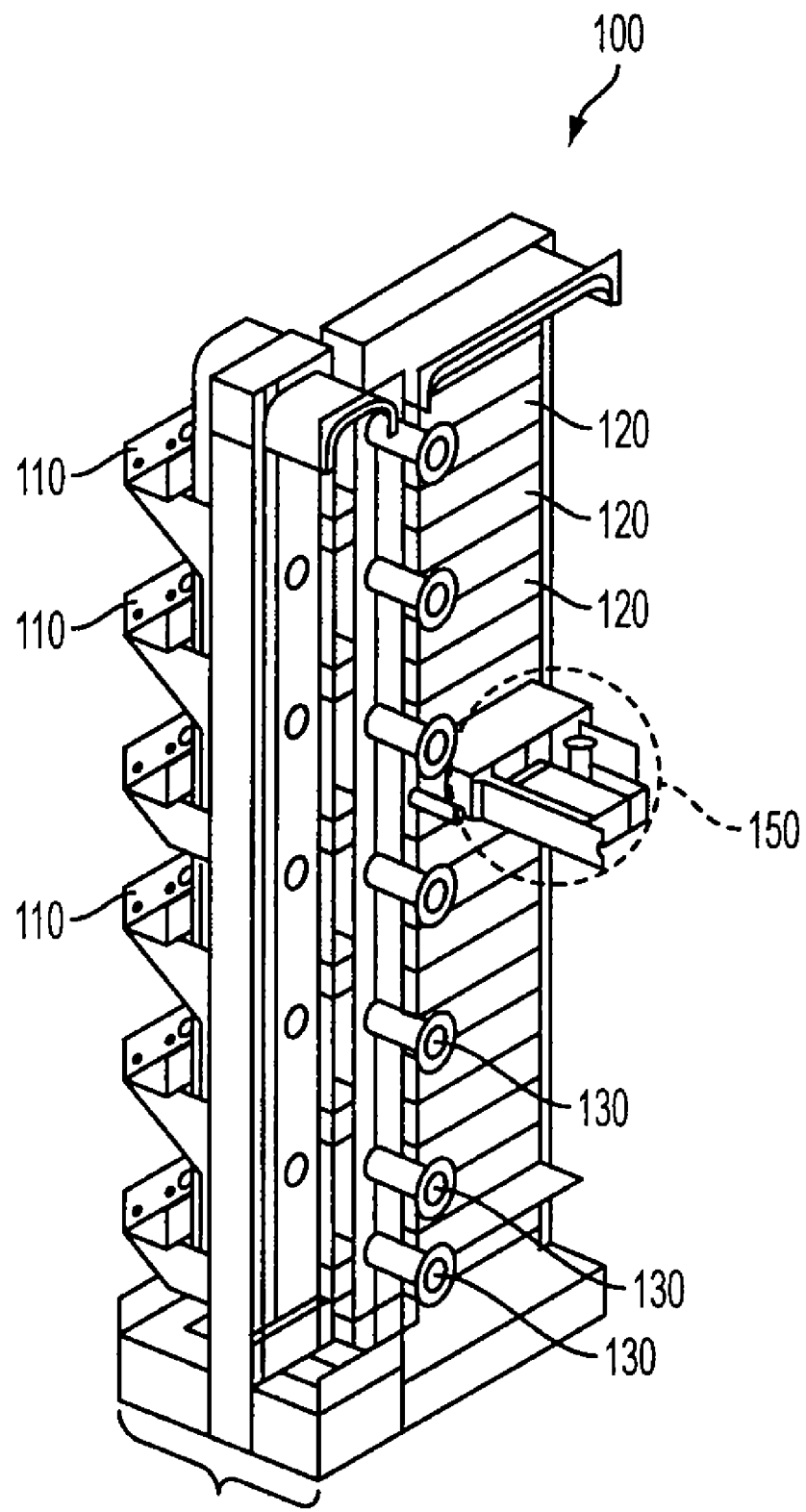
FIG. 1 is an example of a known fiber distribution system.
Figure 2:
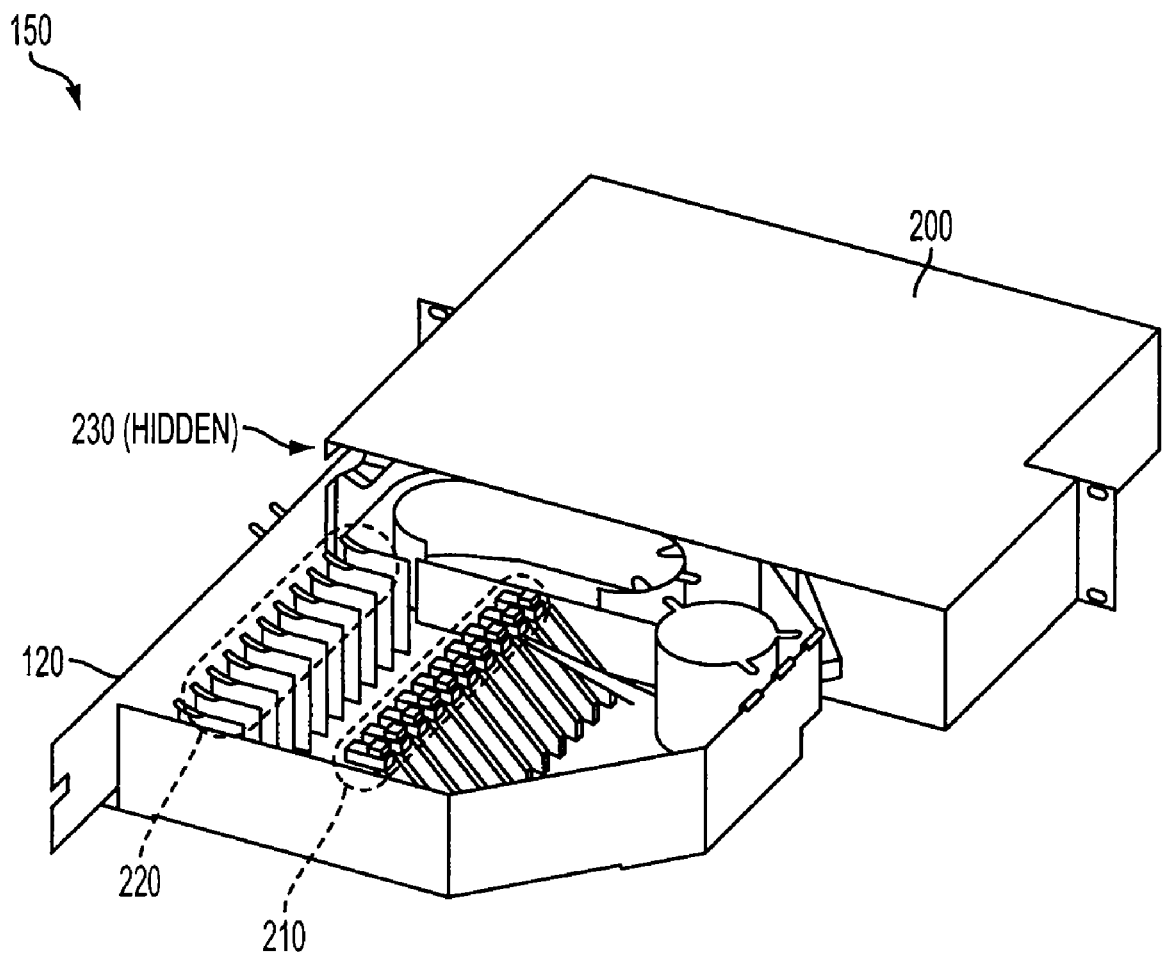
FIG. 2 is a close-up view of a termination module in the fiber distribution system of FIG. 1.

Referring now to the drawings, FIG. 1 illustrates a known fiber distribution system 100. The main components of fiber distribution system 100 are a rear located fiber storage rack 110, a stack of termination modules 150, which contain hinged panels 120 where the fiber connections are made, and a series of spools 130 along one edge of the termination module 150 stack. FIG. 2 is a close-up view of the termination module 150 in the fiber distribution system 100 of FIG. 1. The termination module 150 is housed in a protective enclosure 200 and is accessible via the hinged panel 120 which pivots on a hinge 230. Internal to termination module 150 is a set of fiber cable guides 220 and a set of fiber terminations 210.

The issues with the known designs for fiber distribution systems 100 in FIG. 1 is that the fiber cables are all concentrated into a couple of locations: the rear fiber storage rack 110 and the spools 130 along one side. This creates a high density of fiber cables and creates fiber cable management problems which can increase the chances of fiber cable damage. In addition to increased chance of cable damage, the design of FIG. 1 also has an increased complexity to new installation and/or modification of existing connections. Fiber cables must be routed in and out of the rear of the termination module 150. Also, in order to connect or disconnect any fiber cable, an installer must unscrew and hinge-out the panel 120 of the termination modules 150 involved. This set-up is not conducive to quick and/or easy modification to the fiber cable connections which comprise the fiber distribution system 100. With these issues in mind, embodiments of the present invention are designed to eliminate high fiber cable density, installation complexity, and overall size, weight, and cost.

Figure 3:
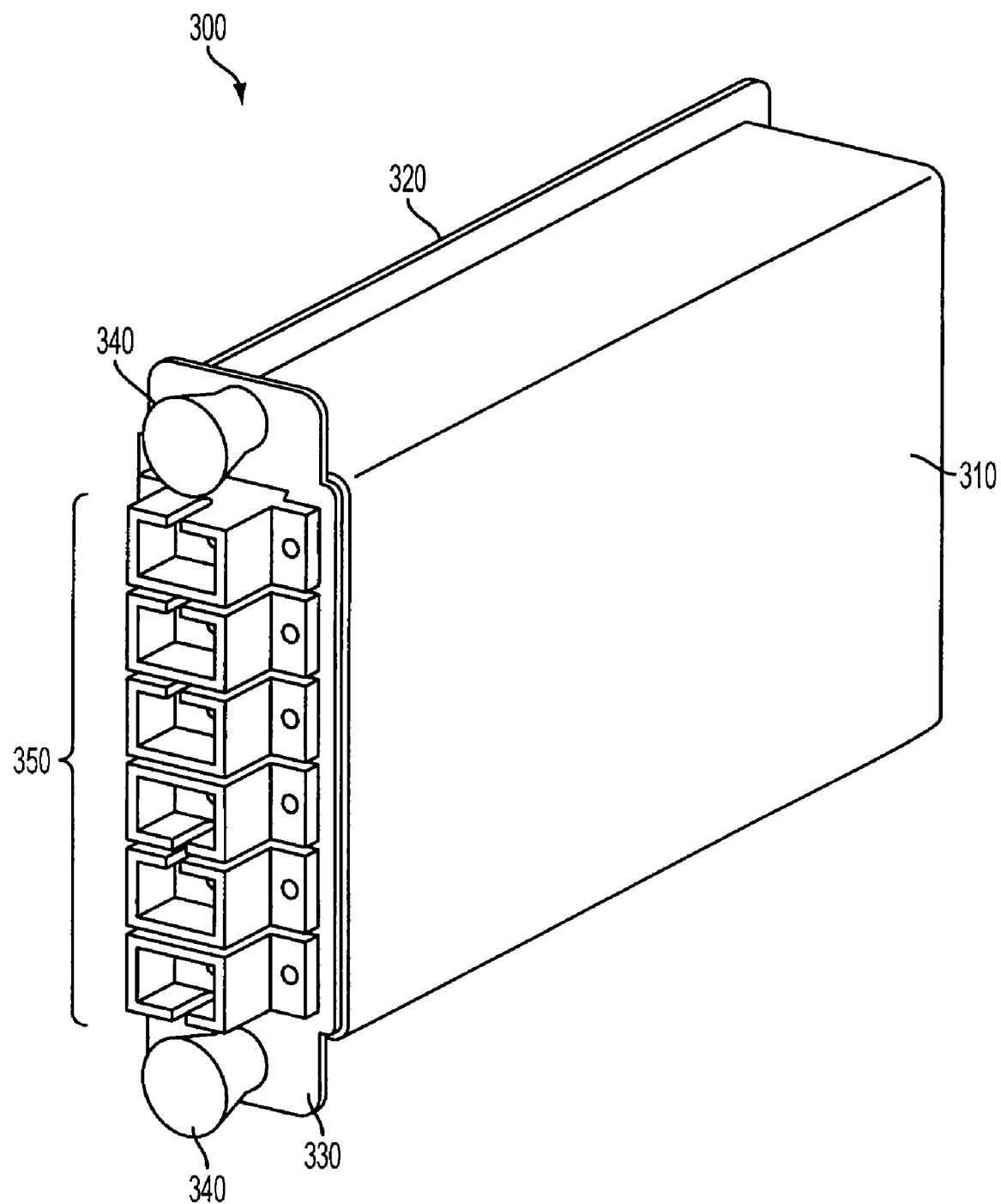
FIG. 3 is a perspective view of a splitter module.

Turning now to FIG. 3, one of the components of the new design is the splitter module 300. The splitter module 300 includes a sealed enclosure 310 which has two flanges: a face flange 330, and a guide flange 320 along one of its sides. The splitter module 300 also includes a pair of fasteners 340. In at least one embodiment, the fasteners 340 comprises a pair of nylatches. Nylatches are usually made of plastic and include a pin and a grommet which fit together through an opening in the face flange 330. The grommet can then be inserted into an opening on a fixed panel. Once installed a simple push/pull is all that is required to engage/disengage the nylatch. This allows for simple fastening/unfastening of the splitter module 300 to/from a fixed panel.

The splitter module 300 also includes a set of Splice Closure (SC) adapters 250. In the example of FIG. 3, six adaptors 250 are shown. It would be apparent to one skilled in the art that any number of adaptors 250 could be used. The splitter module 300 houses a plurality of splitters. The splitters can be of many different types and/or configurations. In at least one embodiment, the different types/configurations could be 2:1, 3:1, 4:1 splitters and could have multiple attenuation characteristics such as a 2:1 with 95% attenuation for one signal and 5% attenuation for the other. These examples are in no way limiting and one skilled in the art would recognize that numerous combinations of types and configurations are envisioned in the embodiments of the present invention.

Figure 4:
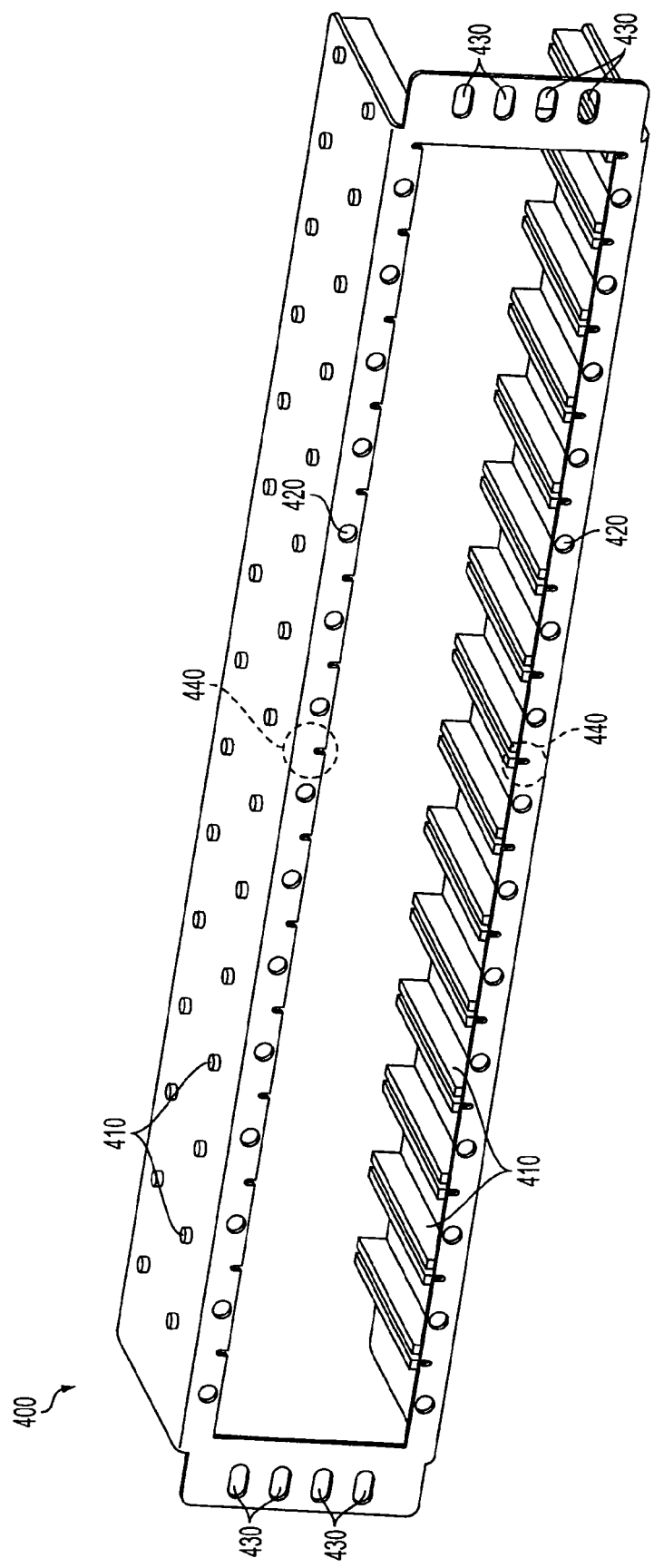
FIG. 4 is a perspective view of a fiber distribution rack.

FIG. 4 shows a fiber distribution rack 400. Key features of the fiber distribution rack 400 are module guides 410, module guide cutouts 440, and fastener receptors 420. In the illustrated embodiment of FIG. 4, the form factor of fiber distribution rack 400 is that of a standard 19 inch mountable rack, although other form factors are also contemplated. Also in this illustrated embodiment, the height of the fiber distribution rack 400 is 2 U (where 1 U=1.75 in). In order to affix fiber distribution rack 400 to a rack mounted chassis (not shown), a set of mounting holes 430 are fashioned along each side of fiber distribution rack 400. In one embodiment, mounting holes 430 are spaced at about 0.625 inches center-to-center.

Figure 5A:
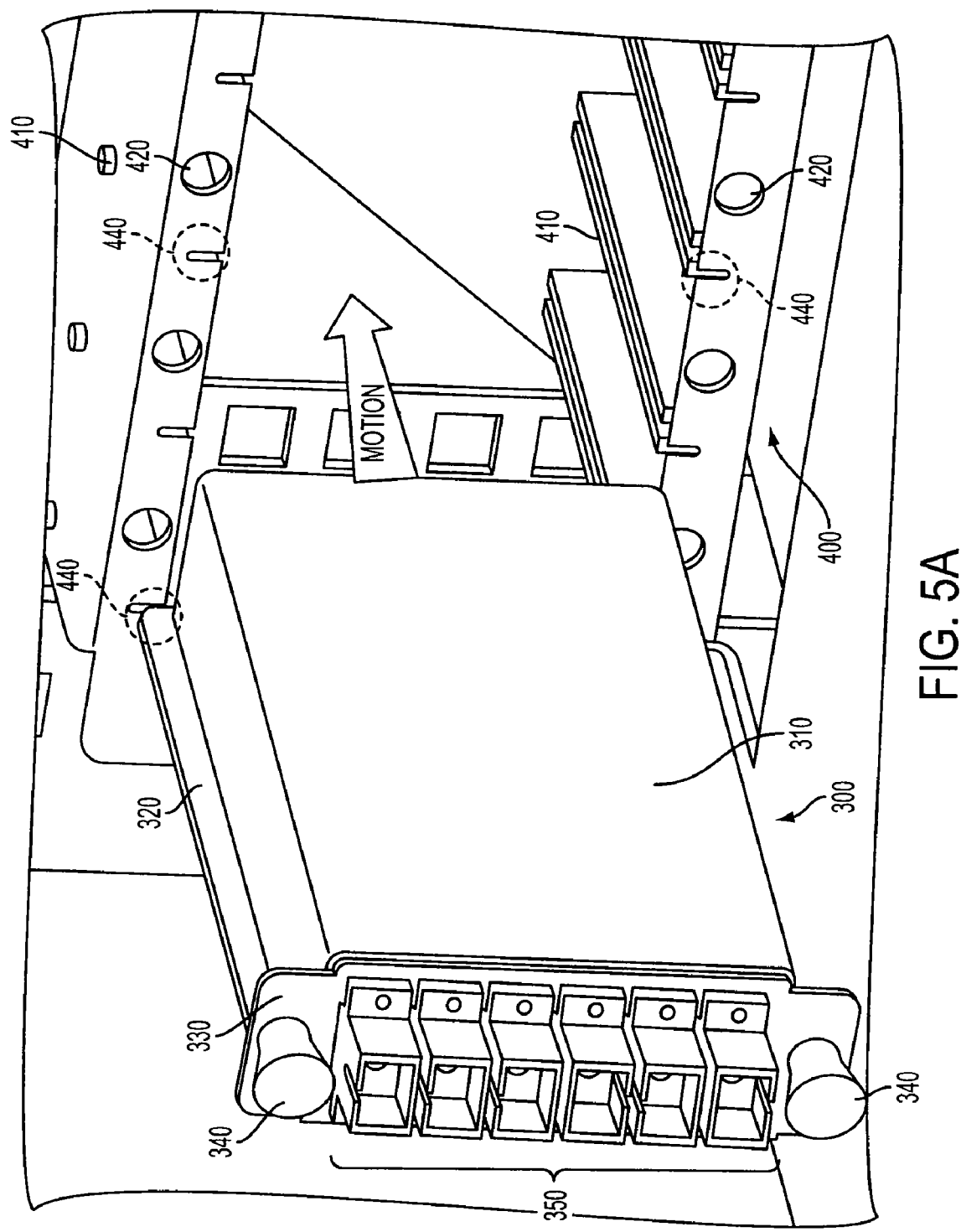
FIG. 5A depicts the splitter module of FIG. 3 being lined-up for installation into the fiber distribution rack of FIG. 4.

FIGS. 5A-D depict how the two components work together in the new design. In FIG. 5A, the guide flange 320 of the splitter module 300 is at the cusp of the module guide cutouts 440, which are directly in-line with the module guides 410. In order to fully install the splitter module 300 into the fiber distribution rack 400, the installer must move the splitter module 300 in the direction of motion illustrated in FIG. 5A. While installing the splitter module 300, the guide flange 320 follows the upper and lower guides 410 until the face flange 330 of the splitter module 300 lies flush with the fiber distribution rack 400. Once the face flange 330 and the fiber distribution rack 400 engage, the fasteners 340 and the fastener receptors 420 should line up and the splitter module 300 can be affixed to the fiber distribution rack 400 by inserting the fasteners 340 into the fastener receptors 420. It is, however, never a requirement that the splitter unit 300 be fully affixed to the fiber distribution rack 400; the splitter module is fully functional at any position within the module guides 410.

Figure 5B:
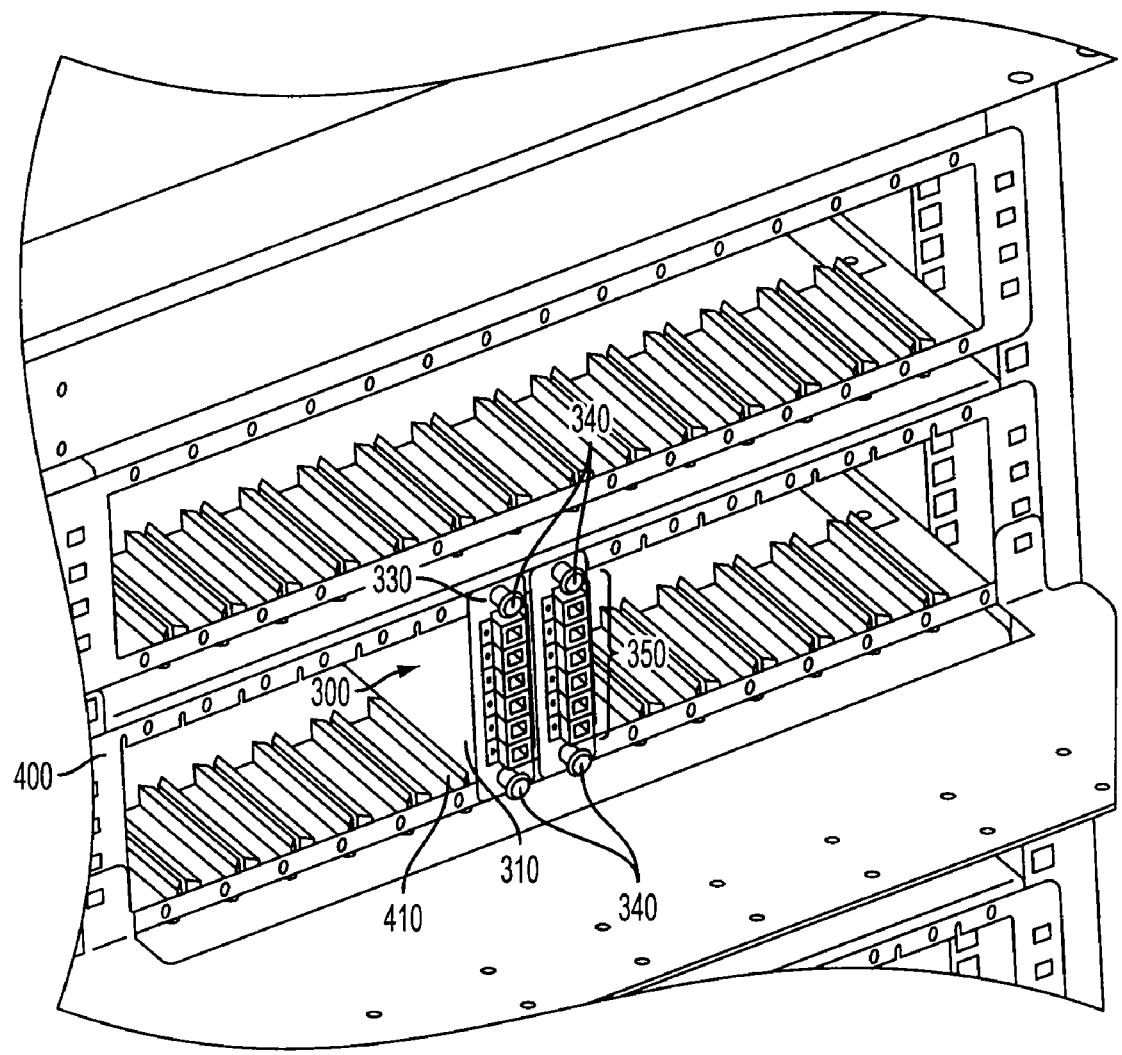
FIG. 5B depicts a stack of fiber distribution racks, with one rack housing two splitter modules.

FIG. 5B shows a stack of fiber distribution racks 400 housed in a rack mountable chassis, with one rack housing, for example, two splitter modules 300. In this view, the two splitter modules 300 are fully installed (fasteners 340 engaged) and located side by side within the fiber distribution rack 400. The use of the module guides 410 ensures that the splitter modules 300 are kept straight and correctly spaced within the fiber distribution rack 400.

Figure 5C:
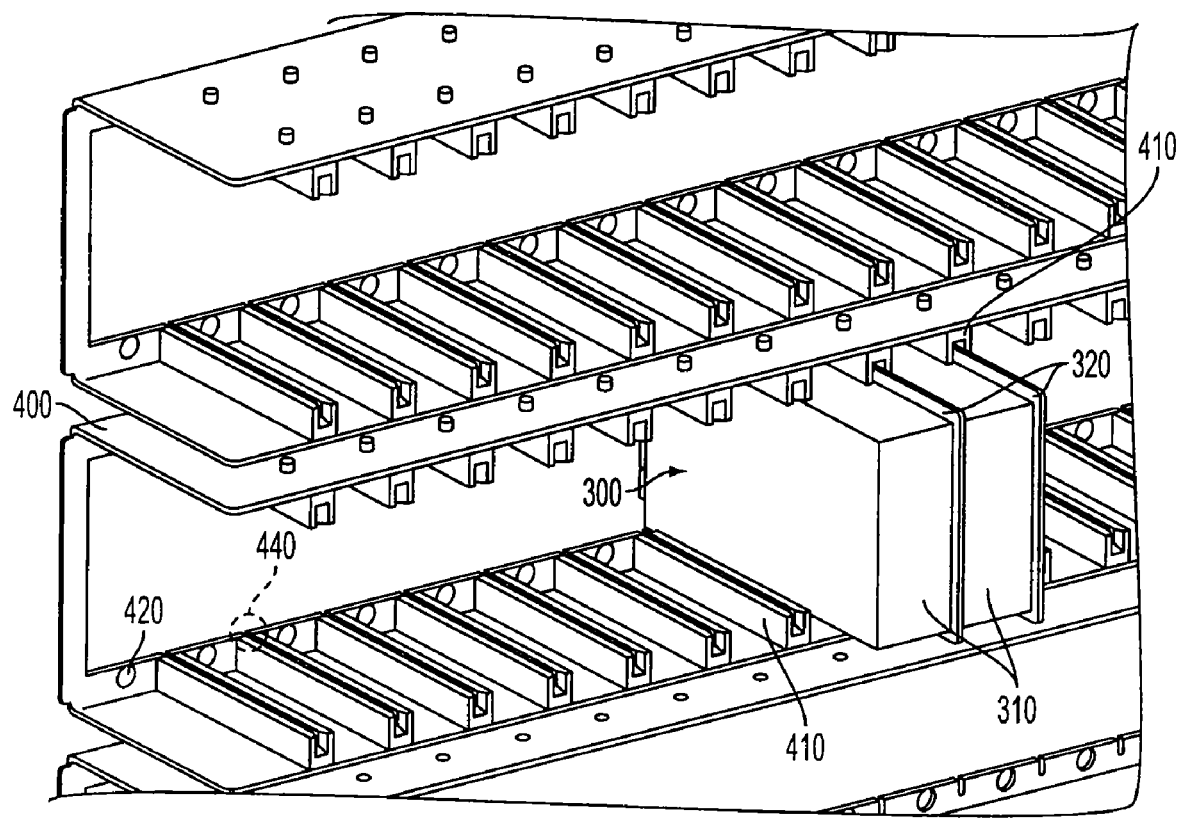
FIG. 5C is a rear perspective of FIG. 5B.

FIG. 5C is a rear perspective of FIG. 5B. This view provides a view of the guide flange 320 engaged with the upper module guide 410.

Figure 5D:
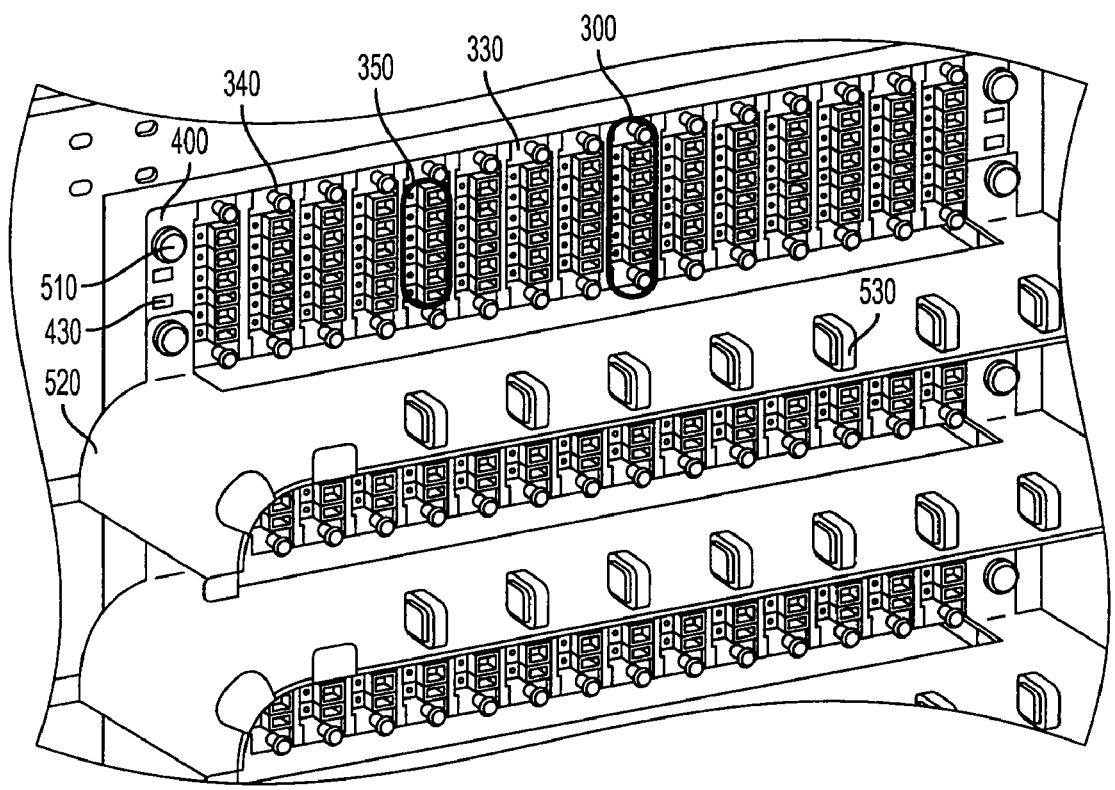
FIG. 5D depicts a stack of fiber distribution racks, each with a full installation of splitter modules, as well as a front cable guide with radius ends.

FIG. 5D depicts a stack of fiber distribution racks 400, each comprising a full installation of splitter modules 300. In addition to the splitter modules 300, the fiber distribution rack 400 has a front cable guide 520 which supports the fiber cable that is destined to be connected to one of the SC adapters 350 of one of the splitter modules 300. FIG. 5D also shows a fastener 510 (e.g., screw, bolt, etc. . . . ) used to affix the fiber distribution rack 400 to the rack mountable chassis. The front cable guide 520 has a radius end on both ends. This avoids sharp edges which could damage the fiber cable either by cutting it or by causing an excessive bend in the fiber cable. The radius end is designed to allow a fiber cable laying across it to not bend past an acceptable bend radius, thus minimizing any bend loss created in the fiber cable. In addition to the radius ends, the front cable guide 520 includes a series of fiber cable retention clips 530. The fiber cable retention clips 530 hold the fiber cables in a way that helps reduce fiber cable density near the splitter modules 300. This is accomplished by holding the fiber cable near the front edge of the front cable guide 520 until the fiber cable is approximately in-line with the splitter module 300 that it is to connect to. Once in-line with the splitter module 300 where the connection is to be made, the fiber cable is routed towards the splitter module 300.

Figure 6A:
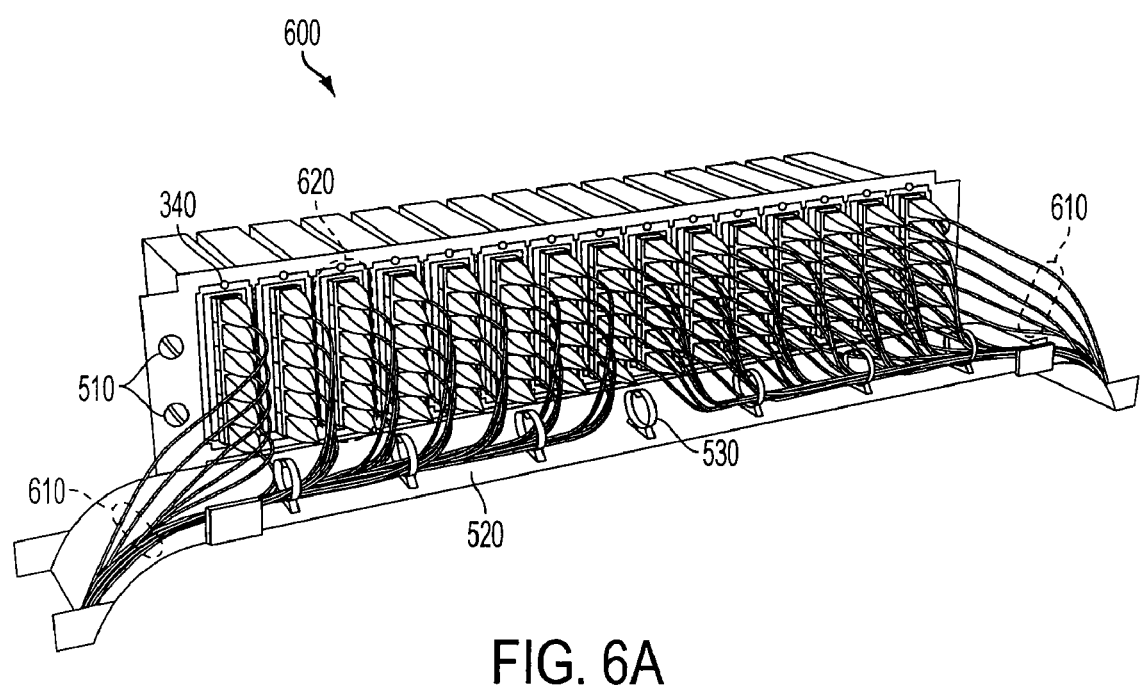
FIG. 6A depicts a fiber distribution rack with full installation of splitter modules and showing fiber cable routing and connections.

FIG. 6A depicts a fiber distribution rack 400 with full installation of splitter modules 300 and showing fiber cable 610 routing and connections 620. The fully assembled, fully connected fiber distribution rack 600 is illustrative of the organized and lower fiber density design of an embodiment of the present invention. In an embodiment of the invention, a fiber distribution rack 400, is mountable via fasteners 510 to a chassis. In at least one embodiment of the invention, the fiber distribution rack 400 can be loaded with up to fifteen (15) splitter modules 300, wherein each can be affixed to the fiber distribution rack 400 via a pair of fasteners 340.

Unlike previous designs, fiber cable 610 can be routed towards the splitter modules 300 from either side of the fiber distribution rack 400. This approximately halves the fiber cable 610 load handled by each side of the fiber distribution system. This feature helps eliminate high density fiber issues and allows for better manageability of the fiber cables 610. Each fiber cable 610 has a connector 620 which engages a SC adapter 350 which is part of the splitter module 300. The design of the splitter modules 300 and SC adapters 350 allow for straight forward connection without having to remove modules or panels, or worry about having to reroute or unroute fiber cables 610 through the rear of the fiber distribution system. In at least one embodiment, entire splitter modules 300 can be disconnected (maximum of six connections) and removed without causing any fiber cable 610 management issues or requiring any complex installation know-how. Reinstallation is no different, very easy and very simple. As can be seen in FIG. 6A, the fiber cables 610 are routed from both sides of the fiber distribution rack 400, resting along the radius of the front cable guide 520 and kept near the front edge of the front cable guide 520 by the fiber cable retention clips 530 until the fiber cable 610 arrives at its respective splitter module 300. At that point it is routed inward to the corresponding SC adapter 350 on the splitter module 300. This set-up allows for a clean, neat, and low-density fiber cable 610 routing, thereby reducing installation complexity and minimizing the chance of fiber cable 610 damage.

Figure 6B:
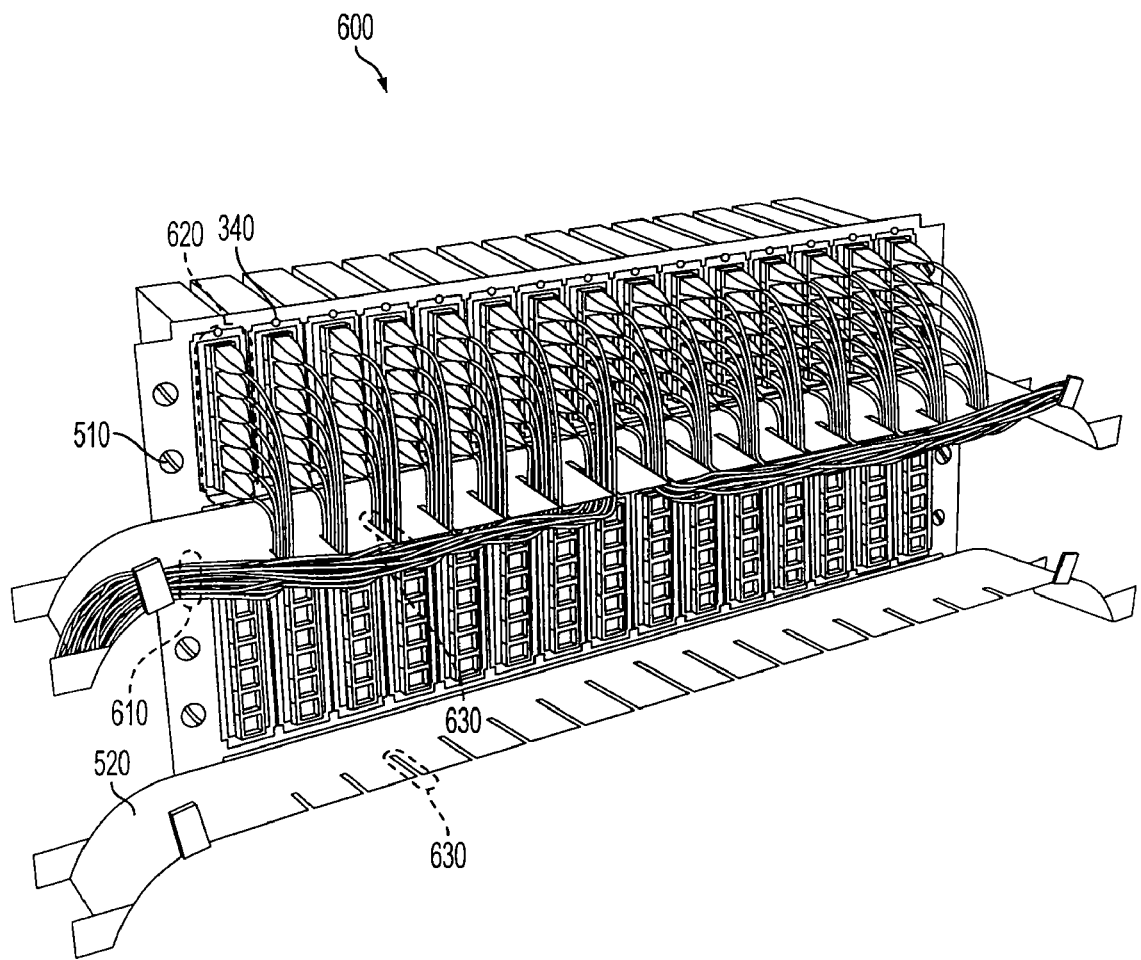
FIG. 6B depicts a pair of fiber distribution racks, each with a full installation of splitter modules, but only one of the fiber distribution racks showing cable routing and connections.

FIG. 6B depicts an alternative embodiment for fiber cable 610 routing. In this embodiment, the front cable guide 520 includes a plurality of cable guide slots 630 that increase in length relative to their location from the ends of the front cable guide 520. The cable guide slots 630 in the center of the front cable guide 520 are longer than the cable guide slots 630 on each end of the front cable guide 520. As can be seen in FIG. 6B, the fiber cables 610 are routed from both sides of the fiber distribution rack 400 under the front cable guide 520 until the fiber cable 601 arrives at its respective splitter module 300. At that point the fiber cable 610 is routed through a cable guide slot 630 and to a corresponding SC adapter 350 on the splitter module 300.

Figure 7:
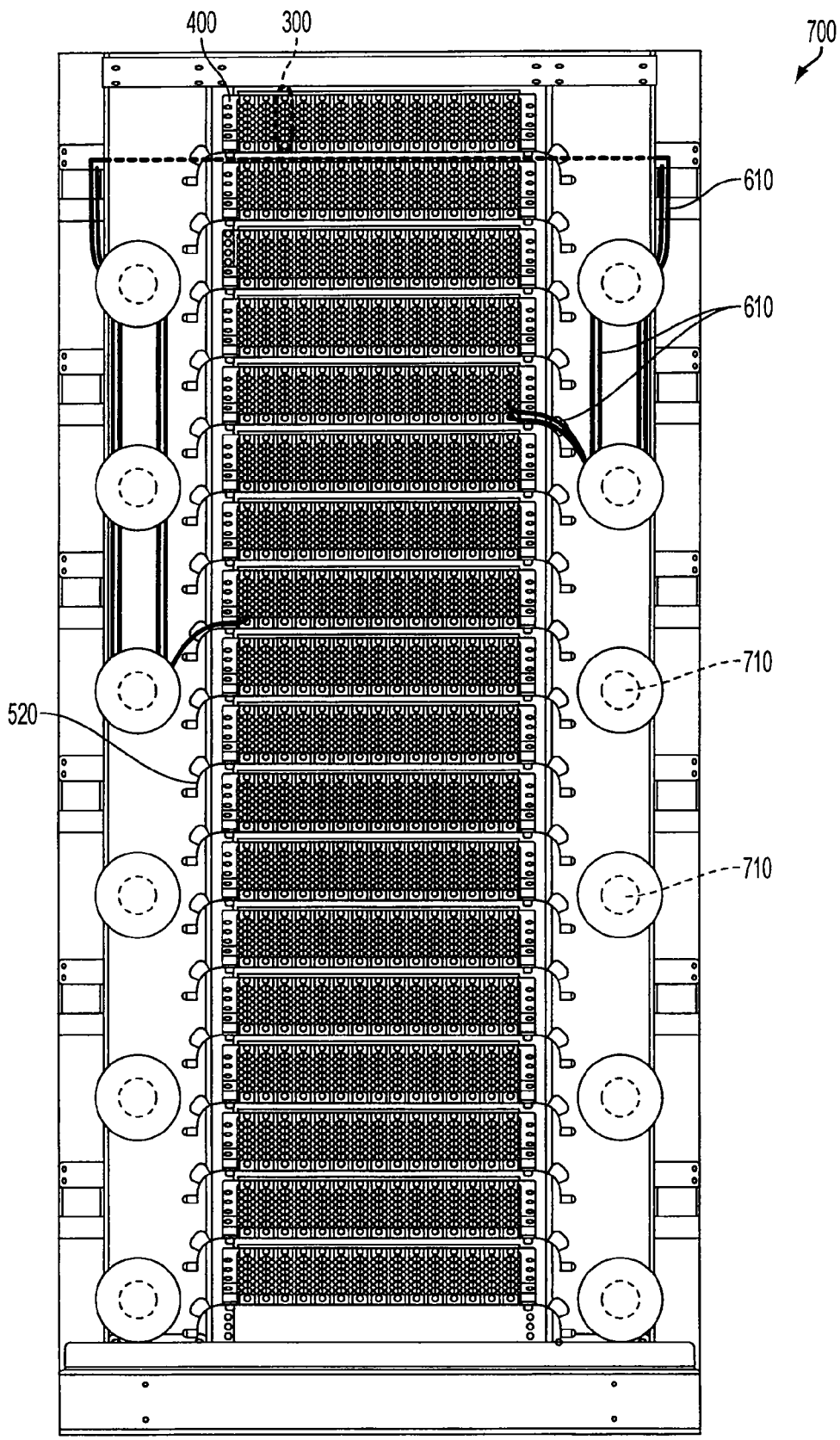
FIG. 7 depicts an entire fiber distribution chassis, with a plurality of fiber distribution racks each housing a plurality of splitter modules.

FIG. 7 illustrates an entire fiber distribution chassis 700, with a plurality of fiber distribution racks 400, each housing a plurality of splitter modules 300. An additional feature illustrated in FIG. 7 is the series of spools 710 located along either side of the fiber distribution racks 400. These spools 710 are very similar to the spools 130 shown in FIG. 1. There is not necessarily a pair of spools 710 for every fiber distribution rack 400. In an embodiment of the present invention, there is one pair of spools 710 for every three fiber distribution racks 400. The spools 710 receive fiber cable 610 which is routed in from both sides of the chassis and are used to route/support the fiber cable 610 before it is routed to a front cable guide 520 for connection to a splitter module 300. Unlike previous designs which used only a single series of spools 710 on one side of the fiber distribution system 700, an embodiment of the present invention has a series of spools 710 on either side of the fiber distribution racks 400. Having a pair of spools decreases the number of fiber cables 610 which are routed to each side, thereby reducing the fiber cable 610 density which makes the system more manageable, decreases complexity, and reduces the opportunity for cable damage due to inadvertent cable bend. The use of double spools 710 (i.e., opposing pairs) also means that fiber cable 610 length can be reduced on some fiber cable routes.

Figure 8:
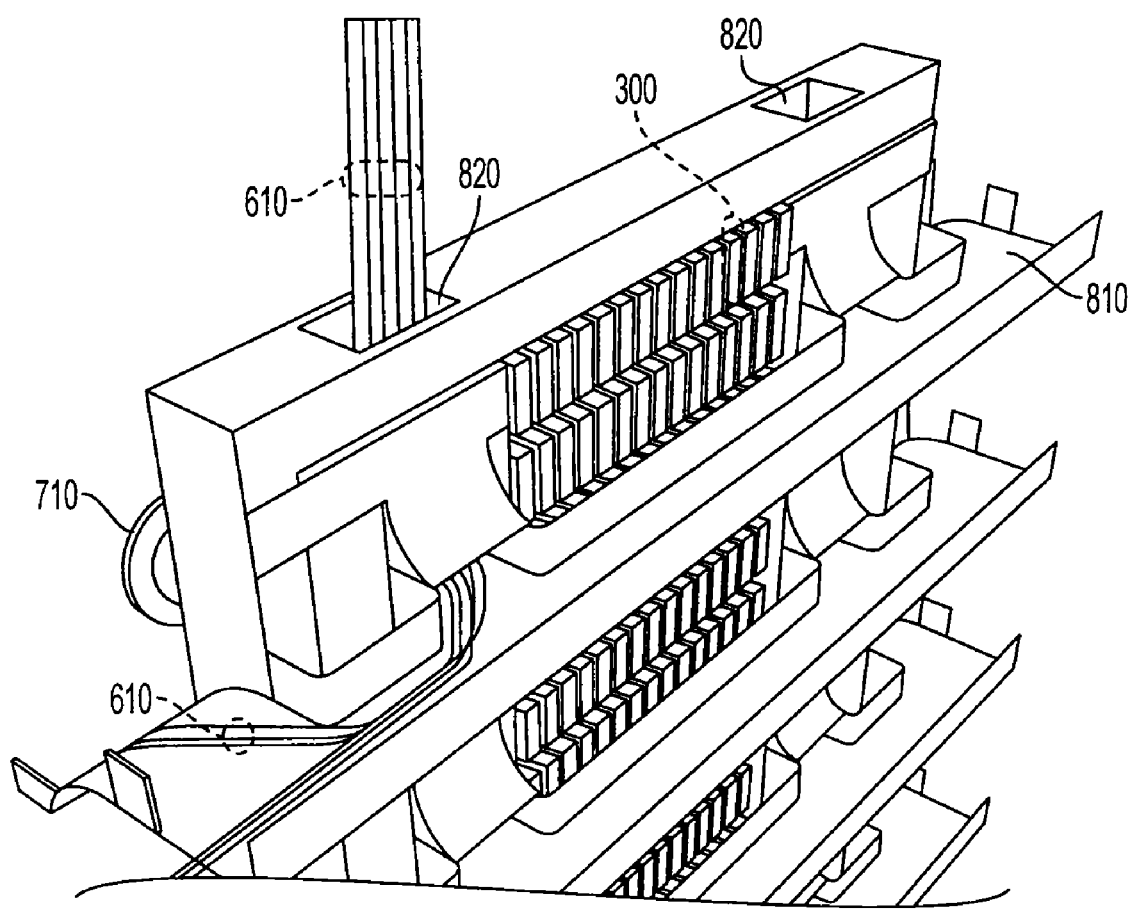
FIG. 8 is a rear perspective of the fiber distribution chassis of FIG. 7 showing the cable entrance and a rear cable guide.

FIG. 8 is a rear perspective of the fiber distribution chassis of FIG. 7 showing the cable entrance 820 and a rear cable guide 810 as well as showing a rear perspective of the splitter modules 300 fully installed in the fiber distribution racks 400. This perspective illustrates the simplicity of the embodiments of the fiber distribution system of this invention. In at least one embodiment, the fiber cables 610 are routed through one of two cable entrances 820 where they continue downward. The fiber cables 610 then exit onto a rear cable guide 810 when the fiber cables 610 have reached the level of the appropriate fiber distribution rack 400. From the rear cable guide 810, which also contains radius ends, the fiber cables 610 are routed onto one or more of a plurality of spools 710 and then onto a front cable guide 520, where they make there way to a connection with one of the plurality of SC adapters 350 which are located on the face flange 330 of each splitter module 300.

It has been shown that the present invention provides a less complex, easier to install, smaller, lighter, and less costly fiber distribution system (FDS).

While an illustrative embodiment of the invention has been described above, it is, of course, understood that various modifications will be apparent to those of ordinary skill in the art. Such modifications are within the spirit and scope of the invention, which is limited and defined only by the appended claims.

The invention claimed is:

1. A fiber distribution system (FDS), comprising:
a rack mountable chassis;
a fiber distribution rack configured to be mountable to the chassis;
a plurality of splitter modules configured to be mounted internal to the rack; and
at least a pair of spools, located on opposing sides of the rack mountable chassis in close proximity to at least one fiber distribution rack, and configured to support one portion of fiber cables when they are coupled with the splitter modules from a first side and are supported by a first spool and a second portion of fiber cables when they are coupled with the splitter modules from a second side and are supported by a second spool.

2. The FDS of claim 1, further comprising:
a cable guide tray configured to be affixed to the front of the fiber distribution rack.

3. The FDS of claim 2, wherein the cable guide tray comprises at least one curved end configured to eliminate excessive cable bend.

4. The FDS of claim 2, wherein the cable guide tray comprises a plurality of cable retention clips positioned on the side of the cable guide tray opposite the connections to the fiber distribution rack and located in line with at least one splitter module.

5. The FDS of claim 2, wherein the cable guide tray comprises a plurality of cable guide slots positioned on the side of the cable guide tray opposite the connections to the fiber distribution rack and located in line with at least one splitter module.

6. The FDS of claim 1, wherein the fiber distribution rack includes a plurality of guides located within the fiber distribution rack for accepting the plurality of splitter modules.

7. The FDS of claim 1, wherein each splitter module further comprises:
a rectangular sealed enclosure with a face flange on one end of the enclosure and a flange along the longer sides of one face of the enclosure;
a plurality of splitters disposed internal to the enclosure;
a plurality of splice closure (SC) adaptors coupled to the plurality of splitters and positioned on the face flange; and
a pair of fasteners positioned through the face flange and configured to affix the splitter module to the fiber distribution rack.

8. The FDS of claim 7, wherein the plurality of splitters comprises different types and configurations.

9. The FDS of claim 7, wherein the pair of fasteners are nylatches.

10. The FDS of claim 7, wherein the fiber distribution rack includes a plurality of guides for accepting the plurality of splitter modules.

11. The FDS of claim 10, wherein the flange along the longer sides of one face of the enclosure facilitates front end loading of the splitter module into the fiber distribution rack by placing the flange into a corresponding pair of the plurality of guides.

12. The FDS of claim 11, wherein the coupling of the longer sides flange and the pair of guides allows the splitter module to be held in an intermediate position.

13. A fiber distribution system (FDS), comprising:
a rack mountable chassis;
at least one fiber distribution rack configured to be mountable to the chassis;
a plurality of splitter modules configured to be mounted internal to the at least one fiber distribution rack through one face of the at least one fiber distribution rack, comprising:
a plurality of splitters disposed internal to each of the plurality of splitter modules; and
a plurality of splice closure (SC) adaptors coupled to the plurality of splitters; and
at least first and second spools, located on the rack mountable chassis on opposing sides of the one face in close proximity to at least one fiber distribution rack, the first spool configured to support a first portion of fiber cables when they are coupled to the splitter modules from a first opposing side of the one face and the second spool configured to support a second portion of fiber cables when they are coupled to the splitter modules from a second opposing side of the one face.

14. The FDS of claim 13, further comprising:
a cable guide tray configured to support fiber cables immediately adjacent the plurality of splitter modules on the one face of the fiber distribution rack.

15. The FDS of claim 14, wherein the cable guide tray comprises at least one curved end configured to eliminate excessive cable bend, the curves being substantially in the direction of the at least first or second spools.

16. The FDS of claim 14, wherein the cable guide tray comprises a plurality of cable retention clips positioned on the side of the cable guide tray opposite the connections to the fiber distribution rack and located in line with at least one splitter module.

17. The FDS of claim 14, wherein the cable guide tray comprises a plurality of cable guide slots positioned on the side of the cable guide tray opposite the connections to the fiber distribution rack and located in line with at least one splitter module.

18. The FDS of claim 13, wherein the fiber distribution rack includes a plurality of notches located within the fiber distribution rack configured to guide the plurality of splitter modules into the fiber distribution rack.

19. The FDS of claim 13, wherein each splitter module further comprises:
a rectangular sealed enclosure with a face flange on one end of the enclosure and a flange along the longer sides of one face of the enclosure; and
a pair of fasteners positioned through the face flange and configured to affix the splitter module to the fiber distribution rack.

20. The FDS of claim 19, wherein the pair of fasteners are nylatches.

21. The FDS of claim 19, wherein the fiber distribution rack includes a plurality of notches located within the fiber distribution rack configured to guide the plurality of splitter modules into the fiber distribution rack.

22. The FDS of claim 21, wherein the flange along the longer sides of one face of the enclosure facilitates loading of the splitter module into the fiber distribution rack by placing the flange into a corresponding pair of the plurality of guides.

23. The FDS of claim 22, wherein the coupling of the longer sides flange and the pair of guides allows the splitter module to be held in an intermediate position.

* * * * *